United States Patent [19]

Scheuerman

[11] Patent Number: 5,364,013
[45] Date of Patent: Nov. 15, 1994

[54] APPARATUS FOR CONNECTING PIPE SECTIONS

[76] Inventor: Robert Scheuerman, 7257 Richard St., Ft. Lupton, Colo. 80621

[21] Appl. No.: 92,005

[22] Filed: Jul. 15, 1993

Related U.S. Application Data

[63] Continuation-in-part of Ser. No. 941,525, Sep. 8, 1992, Pat. No. 5,230,461.

[51] Int. Cl.$^5$ .............................................. B23K 37/053
[52] U.S. Cl. .................... 228/212; 228/49.3; 29/464
[58] Field of Search ............ 228/212, 44.5, 49.3; 29/464

[56] References Cited

U.S. PATENT DOCUMENTS 2,500,204  3/1950  Ronay ............................ 228/44.5
3,710,475  1/1973  Bronstein ........................ 29/240

FOREIGN PATENT DOCUMENTS 1183168  7/1959  France ............................ 228/212
3030421  3/1982  Germany ........................ 228/44.5

Primary Examiner—P. Austin Bradley
Assistant Examiner—Jeffrey T. Knapp
Attorney, Agent, or Firm—Dean P. Edmundson

[57] ABSTRACT

Apparatus is described for transporting sections of pipe and connecting them together for laying pipe above ground or in a trench. The apparatus includes a wheeled frame (e.g., a trailer), a support for one end of a first pipe section, and an alignment mechanism for supporting the other end of the first pipe section and the leading end of a second pipe section so that the opposing ends of the pipe section can be welded together.

4 Claims, 4 Drawing Sheets

APPARATUS FOR CONNECTING PIPE SECTIONS

CROSS-REFERENCE TO RELATED APPLICATION

This application is a continuation-in-part of my copending U.S. patent application Ser. No. 07/941,525, filed Sep. 8, 1992, now U.S. Pat. No. 5,230,461.

FIELD OF THE INVENTION

This invention relates to apparatus and techniques for connecting pipe sections together. More particularly, this invention relates to apparatus and techniques for transporting pipe sections and connecting the sections together for laying on top of the ground or in a trench.

BACKGROUND OF THE INVENTION

Pipe is commonly used for conveying fluids from one location to another. For example, pipe is used for conveying oil, water, or other liquids along the surface of the ground or in a horizontal trench below the surface of the ground. Ordinarily, the pipe sections are threaded at each end such that each pipe section can be threadably connected to the next pipe section. Alternatively, the pipe sections are not threaded but rather are welded end-to-end.

Although powered apparatus is commonly used for connecting and disconnecting pipe sections used in vertical environments (e.g., oil wells), pipe sections for use in horizontal environments are conventionally connected manually. That is, one pipe section is aligned with another pipe section and then the pipe sections are either threaded together or are welded together by means of manual labor. This is a time-consuming and labor-intensive process.

Pipe sections which are not threaded may be secured together by welding, zaplocking, or fusing (plastic) pipe. The zaplock method uses pipe which has a bell shape on one end. The other end of the pipe has a groove around it. Epoxy is applied to the grooved end of the pipe which is then forced into the bell shaped end of another pipe section to form a joint.

The conventional process for welding sections of pipe together involves laying pipe sections onto timber skids along the intended path of the pipeline. A bulldozer with a sidearm known as a sideboom is then used to cradle the pipe sections in proper position so that they can be welded together. Sometimes the pipe sections are also doped and taped before the welded pipe is lowered into a ditch.

There has not heretofore been provided apparatus for laying pipe having the advantages of the apparatus of the present invention.

SUMMARY OF THE PRESENT INVENTION

In accordance with the present invention there is provided apparatus for transporting sections of pipe and connecting the sections together.

Using the apparatus of this invention, there is less binding and lifting required by manual laborers. This reduces the possibility of injury to laborers. There is also less damage to the pipe because it is not dropped to the ground from a trailer when it is laid. With less damage to the pipe coating, the environment surrounding the pipe is safer for a longer period of time than is conventionally provided. Because the pipe is less subject to being damaged, the costs associated with repairing or replacing pipelines are reduced.

In a preferred embodiment, the invention provides apparatus and techniques for use in welding pipe sections together. The apparatus comprises, in one embodiment:

(a) a wheeled frame including forward and rearward ends; wherein the frame includes an area for supporting sections of pipe for transport;

(b) an elevatable arm carried by said wheeled frame which is adapted to elevate one end of a first pipe section;

(c) support means adjacent the rearward end of the wheeled frame for supporting the forward end of a second pipe section to be welded to the first pipe section; and (d) means for aligning the adjacent ends of the first and second pipe sections to be welded together.

The apparatus herein is very useful for transporting sections of pipe and then supporting pipe sections in end-to-end fashion so that they can be welded together. This saves considerable time and is much more convenient and efficient than conventional procedures.

Other advantages of the apparatus of this invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
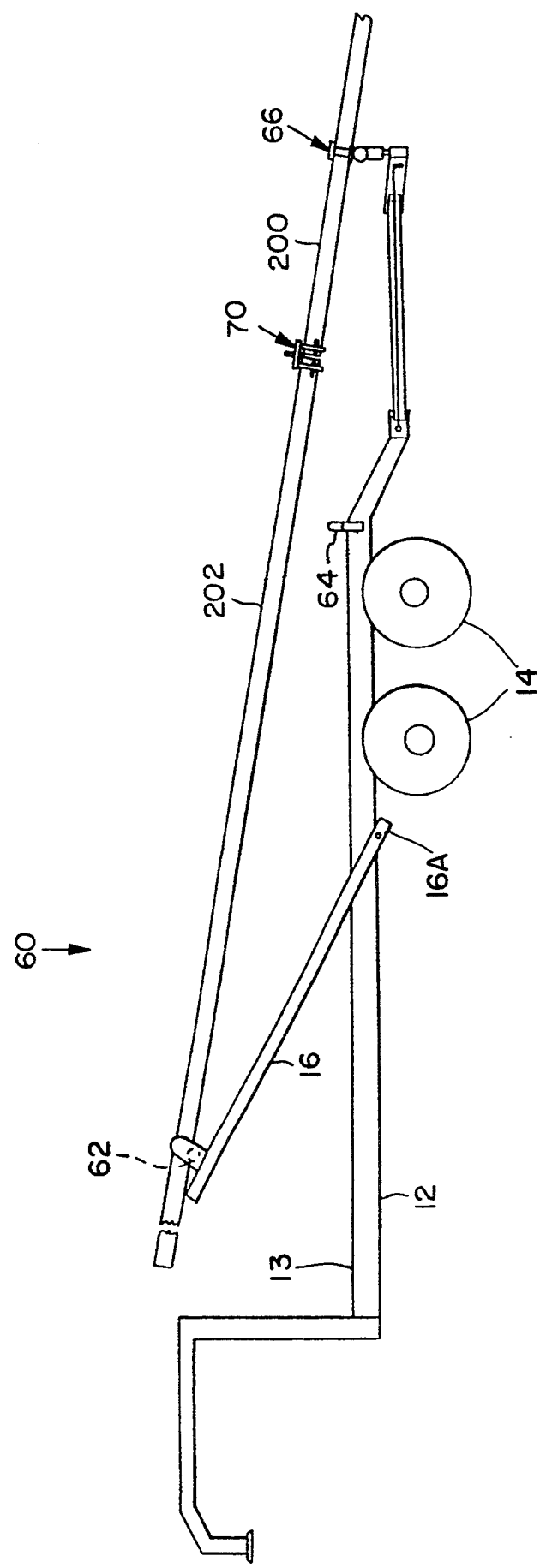
FIG. 1 is a side elevational view of one embodiment of apparatus of the invention.

In the drawings there is illustrated one embodiment of apparatus 60 of the invention for transporting sections of pipe and supporting them in end-to-end fashion so that they can be welded together.

The apparatus comprises, for example, a trailer having a frame 12 and wheels 14. The upper surface 13 of the trailer is adapted to support several lengths of pipe.

The apparatus preferably includes an arm 16 including one end 16A which is pivotably attached to one side of the trailer.

The arm 16 preferably is parallel to the side of the trailer. It is also preferable for the arm 16 to be mounted on shaft 22 which is rotatable and also extensible. For example, shaft 22 may be slidably mounted in tubular sleeve 23 which is carried under the bed of the trailer. A hydraulic cylinder 24 is adapted to push shaft 22 outwardly from the edge of the trailer when desired, and it is also adapted to pull the shaft 22 inwardly again (e.g., for transport).

Figure 2:
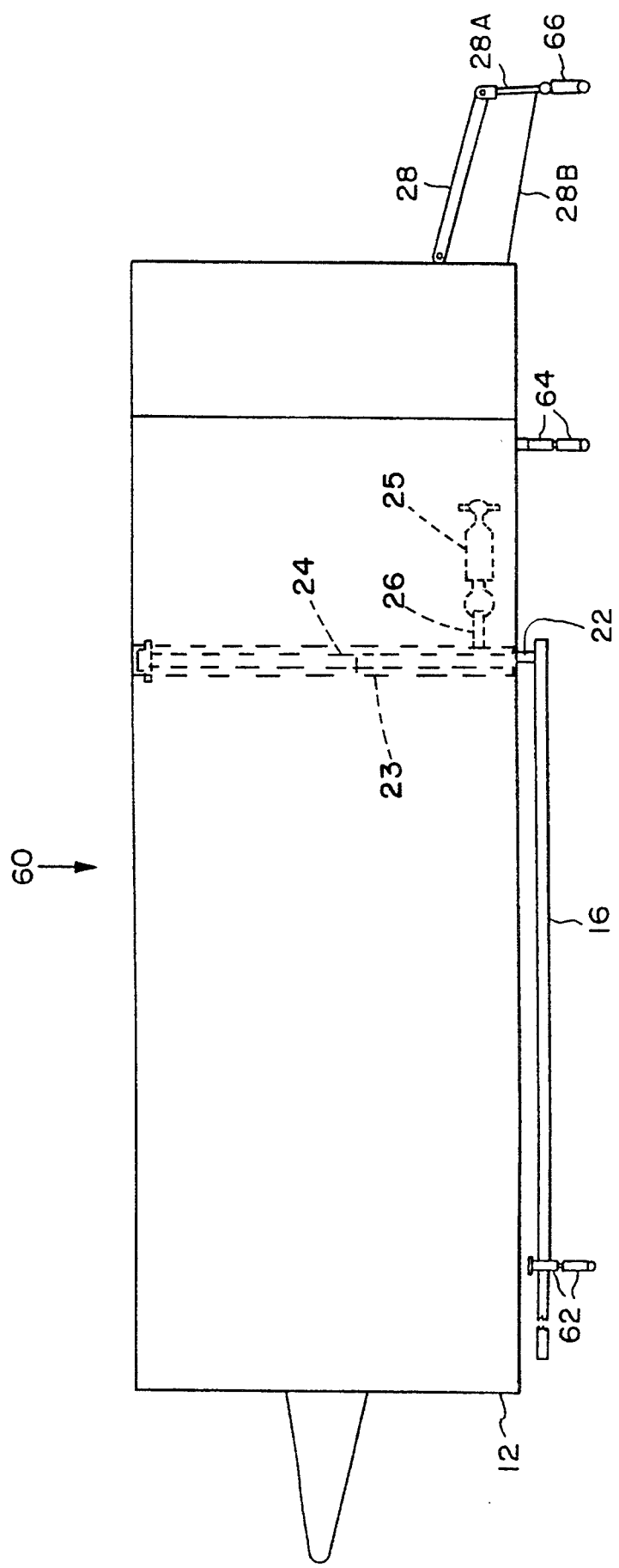
FIG. 2 is a top view of the apparatus of FIG. 1.
Figure 5:
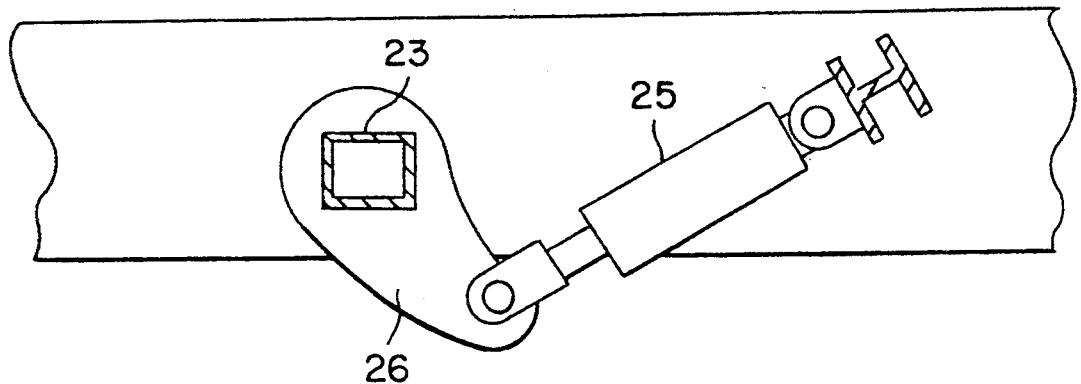
FIG. 5 is a sectional view illustrating the means for elevating a support arm on the trailer.

Hydraulic cylinder 25 (shown in FIGS. 2 and 5) is adapted to rotate sleeve 23 by means of arm 26. Thus, arm 16 can be caused to pivot upwardly or downwardly relative to the trailer by means of cylinder 25. Arm 16 may be telescoping if desired.

Carried at the forward end of arm 16 are roller means 62. Preferably there are two separate rollers which are axially spaced from each other. At the rear end of the trailer there are additional roller means 64. Again, it is preferred to use two separate rollers which are axially spaced from each other. The roller means 62 and 64 are for the purpose of supporting a pipe section which has been transported on the trailer in preparation for welding the pipe section to another pipe section, as described hereafter.

Mounted rearwardly of the trailer are additional roller means 66. Arms 28 and 28A support these rollers, and rod or brace 28B secures the support arms in proper position.

The apparatus 60 is very useful in transporting pipe sections and then supporting the pipe sections in end-to-end fashion so that they can be welded together. The first pipe section 200 removed from the floor or bed area of the trailer is positioned on rollers 62 and 64 and then moved rearwardly over the rollers so that ultimately the forward end of the pipe is then supported solely by roller means 66.

Then another section 202 of pipe is removed from the trailer and supported on rollers 62 and 64. Section 202 is moved relative to the trailer such that the rearward end of section 202 is in close proximity, but not touching, the forward end of section 200. It is also necessary to longitudinally align sections 200 and 202. Then clamp means 70 is used to temporarily secure the opposing ends of the two pipe sections in proper position to enable them to be welded together. Then the clamp can be removed and the trailer moved forwardly to enable another pipe section to be removed from the trailer bed and welded to the forward end of pipe section 202.

Figure 3:
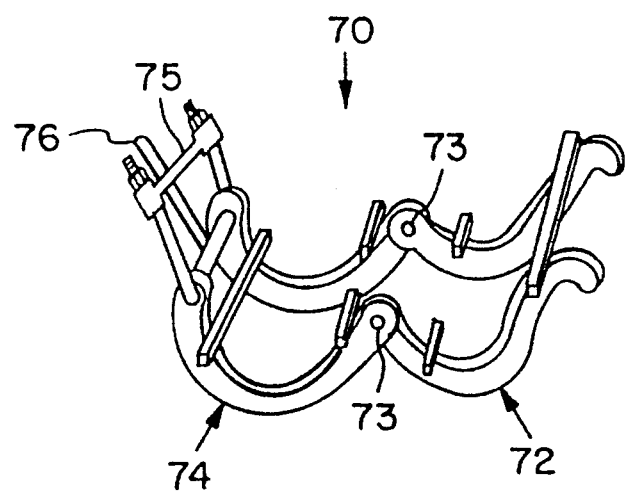
FIG. 3 is a perspective view of a clamp which is useful in holding pipe sections together for welding.
Figure 4:
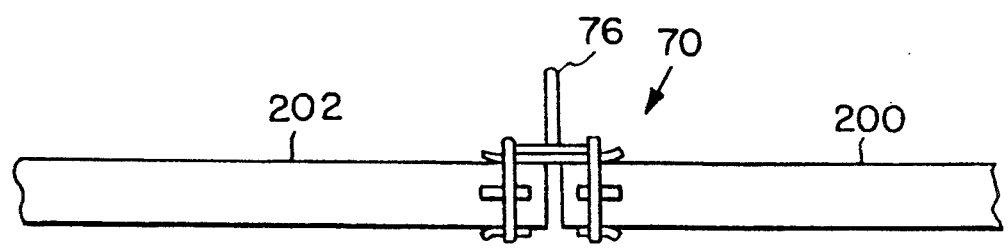
FIG. 4 is a side elevational view showing two sections of pipe held together in preparation for welding.

The preferred clamp means 70 used to hold the opposing ends of the pipe sections to enable welding thereof is commercially available and is illustrated in FIGS. 3 and 4. Preferably the clamp means comprises first and second sections 72 and 74 which are pivotably connected by means of pins or bolts 73. Each clamp section includes spaced-apart support members which are curved (generally semicircular). Cross members are secured to the support members. Some of the cross members do not extend completely across the full span of the support members.

The outer ends of the support members of section 72 are curved downwardly or otherwise include hook portions. Pivotably attached to the outer ends of the support members of section 74 is latch means 75. When the clamp sections 72 and 74 are pivotably closed around the ends of the two pipe sections, the latch means can be pivoted over the outer ends of the hook portions of clamp section 72. Then the clamp is secured by moving handle or lever 76 so as to cause latch means 75 to move against the hook portions. This is accomplished by means of an eccentric mounting between the arms of the latch and the support members of section 74.

The clamp means 70 shown herein enables two pipe sections to be firmly supported in an end-to-end manner with a small gap between them. Then the pipe sections can be spot welded together, after which the clamp can be removed. Then the entire circumference of the joint can be welded.

The apparatus described and illustrated herein is very convenient for transporting pipe sections and enabling the sections to be connected together. The apparatus enables very efficient operation with uniform results.

Other variants are possible without departing from the scope of the invention.

What is claimed is:

1. A method for transporting sections of pipe and connecting said sections together in end-to-end fashion by welding; wherein said method comprises the steps of:
    (a) providing a wheeled frame for carrying said sections of pipe;
    (b) providing alignment means for stationarily supporting a first pipe section and one end of a second pipe section in axial alignment with each other;
    (c) temporarily clamping the opposed ends of said first and second pipe sections in close proximity to each other with a single clamp engaging and aligning said opposed ends; and
    (d) connecting said opposed ends of said pipe sections by welding thereof.

2. A method in accordance with claim 1, wherein said opposed ends of said first and second pipe sections are detachably clamped together while said second pipe section is supported by said alignment means.

3. A method in accordance with claim 1, wherein said wheeled frame further includes an arm pivotably attached to said frame for supporting one end of said second pipe section when the opposed ends of said first and second pipe sections are clamped together.

4. A method in accordance with claim 1, comprising the further steps of:
    (a) moving said wheeled frame forwardly;
    (b) aligning a third pipe section axially with said second pipe section;
    (c) temporarily clamping the opposed ends of said second and third pipe sections in close proximity to each other; and
    (d) connecting said opposed ends of said second and third pipe sections by welding thereof.

* * * * *